United States Patent
Kim

(10) Patent No.: US 9,577,559 B2
(45) Date of Patent: Feb. 21, 2017

(54) APPARATUS AND METHOD FOR CONTROLLING POWER GENERATION OF VEHICLE

(71) Applicants: HYUNDAI MOTOR COMPANY, Seoul (KR); KIA MOTORS CORP., Seoul (KR)

(72) Inventor: Hyun Kim, Hwaseong-Si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/820,506

(22) Filed: Aug. 6, 2015

(65) Prior Publication Data
US 2016/0268943 A1 Sep. 15, 2016

(30) Foreign Application Priority Data
Mar. 12, 2015 (KR) .......................... 10-2015-0034313

(51) Int. Cl.
*H02P 9/48* (2006.01)
*B60R 16/02* (2006.01)

(52) U.S. Cl.
CPC ...... *H02P 9/48* (2013.01); *B60R 16/02* (2013.01)

(58) Field of Classification Search
CPC .................................. H02P 9/48; B60R 16/02
USPC ............................................................ 322/18
See application file for complete search history.

(56) References Cited

U.S. PATENT DOCUMENTS

| | | | | |
|---|---|---|---|---|
| 6,380,718 B1* | 4/2002 | Davis, Jr. | ............... | H02J 7/245 318/811 |
| 2001/0030843 A1 | 10/2001 | Takagi | | |
| 2007/0069521 A1* | 3/2007 | Jabaji | ..................... | F02D 29/06 290/40 C |
| 2007/0114976 A1* | 5/2007 | Inokuchi | ............... | H02J 7/1461 322/28 |
| 2007/0268003 A1* | 11/2007 | Kolomeitsev | ............ | H02H 7/06 322/33 |
| 2009/0039838 A1* | 2/2009 | Maehara | ................. | H02J 7/245 322/19 |
| 2011/0260696 A1* | 10/2011 | Nishimura | .............. | H02P 9/006 322/28 |
| 2011/0260697 A1* | 10/2011 | Nishimura | .............. | H02P 9/006 322/28 |

(Continued)

FOREIGN PATENT DOCUMENTS

JP 2008-148468 6/2008
JP 2009-219246 A 9/2009
(Continued)

*Primary Examiner* — Viet Nguyen
(74) *Attorney, Agent, or Firm* — McDermott Will & Emery LLP

(57) ABSTRACT

An apparatus for controlling power generation of a vehicle includes an alternator for generating electricity using an engine torque. A controller is configured to calculate a difference between a first duty value and a second duty value and to transmit a control signal based on the difference. The first duty value is an output duty value of the alternator before reaching a predetermined time, and the second duty value is a current output duty value of the alternator. A regulator gradually increases the amount of power generated by the alternator during a delay time based on the control signal received from the controller.

11 Claims, 3 Drawing Sheets

(56) References Cited

U.S. PATENT DOCUMENTS

| | | | | |
|---|---|---|---|---|
| 2013/0134950 A1* | 5/2013 | Tisserand | ............. | H02J 7/1461 322/28 |
| 2013/0334818 A1* | 12/2013 | Mashal | ................ | F03D 7/0264 290/44 |
| 2014/0042990 A1* | 2/2014 | Maruyama | ............. | H02P 9/102 322/28 |
| 2015/0123624 A1* | 5/2015 | Ookawa | ................ | B60W 30/02 322/22 |

FOREIGN PATENT DOCUMENTS

| | | |
|---|---|---|
| KR | 10-2006-0068801 A | 6/2006 |
| KR | 10-2013-0060567 A | 6/2013 |

\* cited by examiner

FIG. 2

| DIFFERENCE | 10% | 20% | 30% | 40% | 50% | 60% | 70% | 80% |
|---|---|---|---|---|---|---|---|---|
| DELAY TIME(s) | 0 | 0 | 2 | 2 | 3 | 3 | 4 | 5 |

APPARATUS AND METHOD FOR CONTROLLING POWER GENERATION OF VEHICLE

CROSS-REFERENCE(S) TO RELATED APPLICATION

The present application claims the benefit of priority to Korean Patent Application Number 10-2015-0034313 filed on Mar. 12, 2015, the entire content of which application is incorporated herein for all purposes by this reference.

TECHNICAL FIELD

The present disclosure relates to an apparatus and method for controlling power generation of a vehicle to optimize power generation of an alternator depending on the degree of variation in the power generation of the alternator.

BACKGROUND

Techniques for variably controlling power generation of an alternator have been applied to improve fuel efficiency of a vehicle by preventing the power generation during acceleration or by maximizing the power generation to charge a battery during deceleration. That is, during acceleration, a mechanical load applied to the vehicle is reduced by controlling the power generation of the alternator in order to improve acceleration performance. During deceleration, deceleration performance is improved by using torque generated by the maximum power generation of the alternator, thus improving the fuel efficiency of the vehicle.

Previously, in controlling power generation of a vehicle, an alternator and an engine control unit (ECU) control the power generation using analog waveform signals (pulse width modulation (PWM)) through multiple wires. The multiple wires include an FR-line for transmitting a signal indicative of a state of power generation of the alternator to the ECU, and a C-line for transmitting a signal relating to the control of power generation to the alternator.

However, recently, local interconnect network (LIN) communication, which transmits and controls digital values using a LIN communication line, for an alternator has been developed. Here, the alternator includes a regulator for controlling power generation. The regulator controls the power generation by transmitting and receiving information to and from an ECU. The regulator has a load response control (LRC) function, which prevents rapid variation in an electric load applied to a vehicle. When the electric load is generated rapidly while the vehicle travels, the alternator generates a torque for the power generation, and at this time, the engine revolutions per minute (RPM) changes rapidly. Therefore, the LRC function gradually increases the power generation of the alternator when the electric load is rapidly generated, thereby reducing variation of the engine RPM of the vehicle.

According to the related art, a constant LRC value is used for the LRC function. In other words, the duration for which the power generation of the alternator gradually increases is applied consistently. The LRC value is fixed as an optimized value by testing a vehicle and predicting variation in the engine RPM according to the variation in the electric load of the vehicle, and by predicting a state of illumination of a headlight or a dome light.

However, since a fixed LRC value is used, charging performance of a battery is unnecessarily deteriorates. Thus, using variable LRC values may increase efficient, for example, a battery can be stably charged using a lower LRC value regardless of variation in electric load and a vehicle RPM can be stably realized using a higher LRC value regardless of load variation according to increase in the power generation.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art. An aspect of the present inventive concept provides an apparatus and method for controlling power generation of a vehicle in order to maximize stability of an engine RPM and charging efficiency by performing an optimized LRC function depending on the degree of power generation and variation in power generation of an alternator of the vehicle.

According to an embodiment of the present inventive concept, an apparatus for controlling power generation of a vehicle may include an alternator for generating electricity using an engine torque. A controller is configured to calculate a difference between a first duty value and a second duty value and to transmit a control signal based on the difference. The first duty value is an output duty value of the alternator before reaching a predetermined time, and the second duty value is a current output duty value of the alternator. A regulator gradually increases an amount of power generation of the alternator during a delay time based on the control signal received from the controller.

The controller and the regulator communicate with each other through local interconnect network (LIN) communication.

The controller is an engine control unit (ECU).

When the difference is greater than a predetermined value, the controller transmits a control signal that increases the delay time as the difference is higher.

The delay time is previously mapped to the difference.

When the difference is equal to or less than a predetermined value, the controller sets the delay time to a maximum value and transmits a control signal to prevent the amount of power generation from increasing by instructing the regulator that controls the alternator.

The regulator operates the alternator normally after the delay time elapses.

According to another embodiment of the present inventive concept, a method for controlling power generation of a vehicle may include receiving, by a controller, information about a current output duty value of an alternator from a regulator. A difference between a first duty value and a second duty value is calculated by the controller. The first duty value is an output duty value of the alternator before reaching a predetermined time, and the second duty value is a current output duty value of the alternator. A control signal for gradually increasing an amount of power generation of the alternator during a delay time is transmitted to the regulator by the controller, based on the calculated difference.

The method further includes comparing the difference with a predetermined value before transmitting the control signal. The delay time is set according to the comparison result of the difference with the predetermined value. In the step of transmitting the control signal, the control signal is transmitted based on the set delay time.

When the difference is greater than the predetermined value, the delay time is set to be longer as the difference is higher when setting the delay time.

When the difference is equal to or less than the predetermined value, the delay time is set to a maximum value when setting the delay time. When the delay time is set to the maximum value, the controller transmits a control signal to prevent an amount of power generation of the alternator from increasing in the step of transmitting the control signal.

According to the apparatus and method for controlling power generation of a vehicle as described above, the duration for performing an LRC function is variably controlled based on the amount of power generated by an alternator and variation in power, whereby rapid variation in the engine RPM of a vehicle and charging faults may be effectively prevented.

Further, LIN communication using digital values, rather than an existing PWM communication method, is applied to an alternator so that the duty value of the alternator and an LRC signal according to a duty value may be accurately transmitted to and received from a control unit.

BRIEF DESCRIPTION OF THE DRAWINGS

The above and other objects, features and other advantages of the present invention will be more clearly understood from the following detailed description taken in conjunction with the accompanying drawings.

FIG. 2 is a table illustrating the relationship between delay time control and the difference between first and second duty values according to an embodiment of the present inventive concept.

DETAILED DESCRIPTION

Hereinafter, an apparatus for controlling power generation of a vehicle according to an embodiment of the present inventive concept is described referring to the accompanying drawing.

Figure 1:
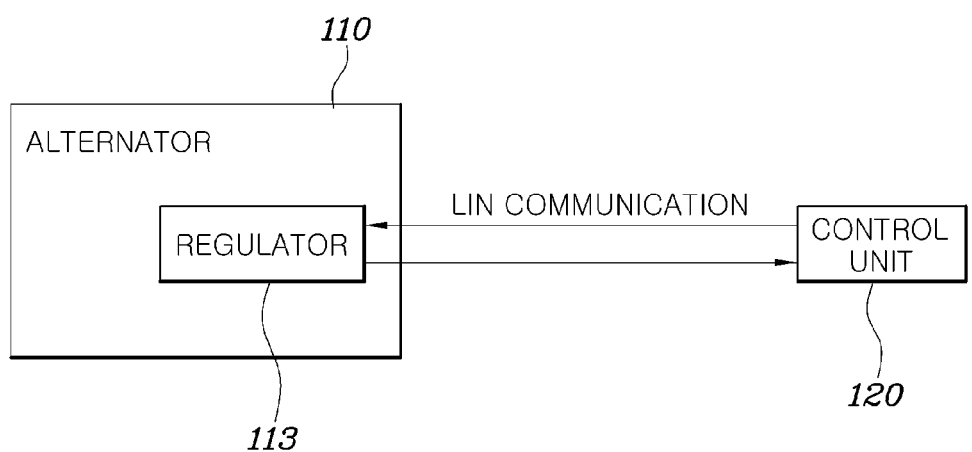
FIG. 1 is a block diagram illustrating an apparatus for controlling power generation of a vehicle according to an embodiment of the present inventive concept.

FIG. 1 is a block diagram illustrating an apparatus for controlling power generation of a vehicle according to an embodiment of the present inventive concept. Referring to FIG. 1, the apparatus for controlling power generation of a vehicle may include an alternator 110 for generating electricity using engine torque. A controller 120 is configured to calculate a difference between a first duty value and a second duty value and to transmit a control signal based on the difference. A regulator 113 gradually increases the amount of power generated by the alternator 110 during a delay time, based on the control signal received from the controller 120. Here, the first duty value is an output duty value of the alternator 110 before reaching a predetermined time, and the second duty value is a current output duty value.

When an electric load rapidly varies due to operation of electronic devices in the vehicle while the vehicle travels, the alternator 110 generates the power in response to the electric load. As the alternator 110 generates electricity using an engine torque, instability may occur in an engine revolutions per minute (RPM), thus deteriorating driver's comfort and engine RPM stability.

Therefore, when a rapid electric load is generated in the alternator 110, the regulator 113 performs load response control (LRC), which gradually increases the power generation of the alternator 110, rather than sharply increasing the power generation. Here, the amount of power generation of the alternator 110 corresponds to the duration for which the alternator 110 generates the power. As the duration of power generation of the alternator 110 increases, the amount of power generated by the alternator 110 also increases.

According to the related art, when performing LRC, a delay time, for which the amount of power generated by the alternator 110 gradually increases, is applied consistently. However, according to the present disclosure, the delay time, for which LRC is performed, is variably controlled, and thus, variation in the engine RPM attributable to rapid variation in the electric load of a vehicle may be effectively and actively controlled.

In detail, the controller 120 detects variation in the output duty value of the alternator 110 at a predetermined time interval. Here, the output duty value of the alternator 110 before the predetermined time is the first duty value, and the current output duty value of the alternator 110 is the second duty value. The output duty value is represented as a percentage. When the output duty value of the alternator 110 is 50%, it indicates that the alternator 110 generates half of the maximum power that the alternator 110 can generate.

For example, when the regulator 113 detects that the first duty value of the alternator 110 is 10% and the second duty value is 50%, the controller 120 receives a signal corresponding to the duty values from the regulator 113. Then, the controller 120 calculates a percentage expressing the difference between the duty values during the predetermined time, which is 40%, and transmits a control signal corresponding to the difference to the regulator 113. The regulator 113 receives the control signal from the controller 120, and performs LRC of the alternator 110 during the delay time, based on the difference.

If the delay time increases, the duration for which the LRC is performed also increases, and the engine RPM is maintained stably. If the delay time decreases, the duration for which the LRC is performed decreases, thus improving response to a charging load. In other words, the present disclosure may optimize the engine RPM stability and power generation efficiency by variably controlling the time duration for which the LRC is performed based on the variation in the amount of power generated by the alternator 110.

The controller 120 and the regulator 113 communicate with each other through a local interconnect network (LIN), and the controller 120 is an engine control unit (ECU).

According to the related art, the regulator 113 in the alternator 110 performs pulse width modulation (PWM) communication using wires with the ECU, which is the controller 120. However, in case of the existing alternator based on PWM, as the ECU receives very limited information from the alternator 110, it is difficult to precisely control the alternator 110 according to the characteristics of power generation of the alternator 110. According to the present disclosure, the alternator 110 and the ECU communicate via the LIN communication, which is a digital communication method. Therefore, the alternator 110 and the ECU may accurately transmit and receive the duty value of the alternator 110 and the LRC signal according to the duty value.

Specifically, the ECU, which is the controller 120, transmits the control signal according to the difference in the duty values of the alternator 110 to the regulator 113 through LIN communication, and the regulator 113 variably controls the delay time, which is the duration for which the LRC is performed, by receiving the control signal.

When the difference of the duty values is greater than a predetermined value, the controller 120 transmits a control signal, in which the delay time is increased as the value of the difference increases.

The predetermined value is set previously to determine whether the output duty value of the alternator 110 changes, and can be set as a random value by a designer. In other words, when the difference is greater than the predetermined value, the controller 120 determines that the LRC is necessary because there is a difference in the output duty values. Accordingly, the controller 120 variably controls the delay time, which is the duration for which the LRC is performed, according to the difference.

FIG. 2 is a table illustrating a relationship between delay time control and a difference between first and second duty values. Referring to FIG. 2, as the difference increases, the delay time increases.

For example, when the difference between the first duty value and the second duty value of the alternator 110 is 80%, the controller 120 determines that there is a high probability of unstable engine RPM due to the rapid operation of the alternator 110, and sets the delay time for LRC as 5 seconds, which is a relatively long period time. Therefore, the engine RMP can be stabilized.

When the difference between the first duty value and the second duty value of the alternator 110 is 30%, instability in engine RPM does not occur because of a weak electric load. Accordingly, the controller 120 sets the delay time to a relatively short period of 2 seconds in order to improve power generation efficiency.

In this case, the delay time may be previously mapped to the difference. In other words, as shown in FIG. 2, through previous testing, a suitable delay time for the LRC can be mapped in advance to the difference in the output duty values of the alternator 110. Using the map, it is possible to quickly perform control without calculating the delay time according to the difference.

FIG. 2 shows the table of the above-mentioned example. Accordingly, without limitation to the example, the delay time can be variably applied depending on a vehicle model or performance of a vehicle.

When the difference is equal to or less than the predetermined value, the controller 120 sets the delay time to a maximum value and transmits a control signal instructing the regulator 113 not to increase the power generated by the alternator 110.

In other words, when the difference between the output duty values of the alternator 110 is equal to or less than the predetermined value, the controller 120 determines that it is not necessary to operate the alternator 110 since no electric load is generated. Then, the delay time for power generation is set as the maximum value to minimize the power generated by the alternator 110, and a gradual increase in the amount of power generated by the alternator 110 is prevented, thus stably maintaining the engine RPM and improving fuel efficiency.

The regulator 113 operates the alternator 110 normally after the delay time elapses.

In other words, after the regulator 113 allows the alternator 110 to gradually increase the power generation during the delay time, the alternator 110 may operate normally according to the output duty value of the alternator 110, and therefore, the requirement for the power generation is satisfied and stable engine RPM is maintained.

Hereinafter, a method for controlling power generation of a vehicle according to an embodiment of the present inventive concept is described with reference to the accompanying drawing.

Figure 3:
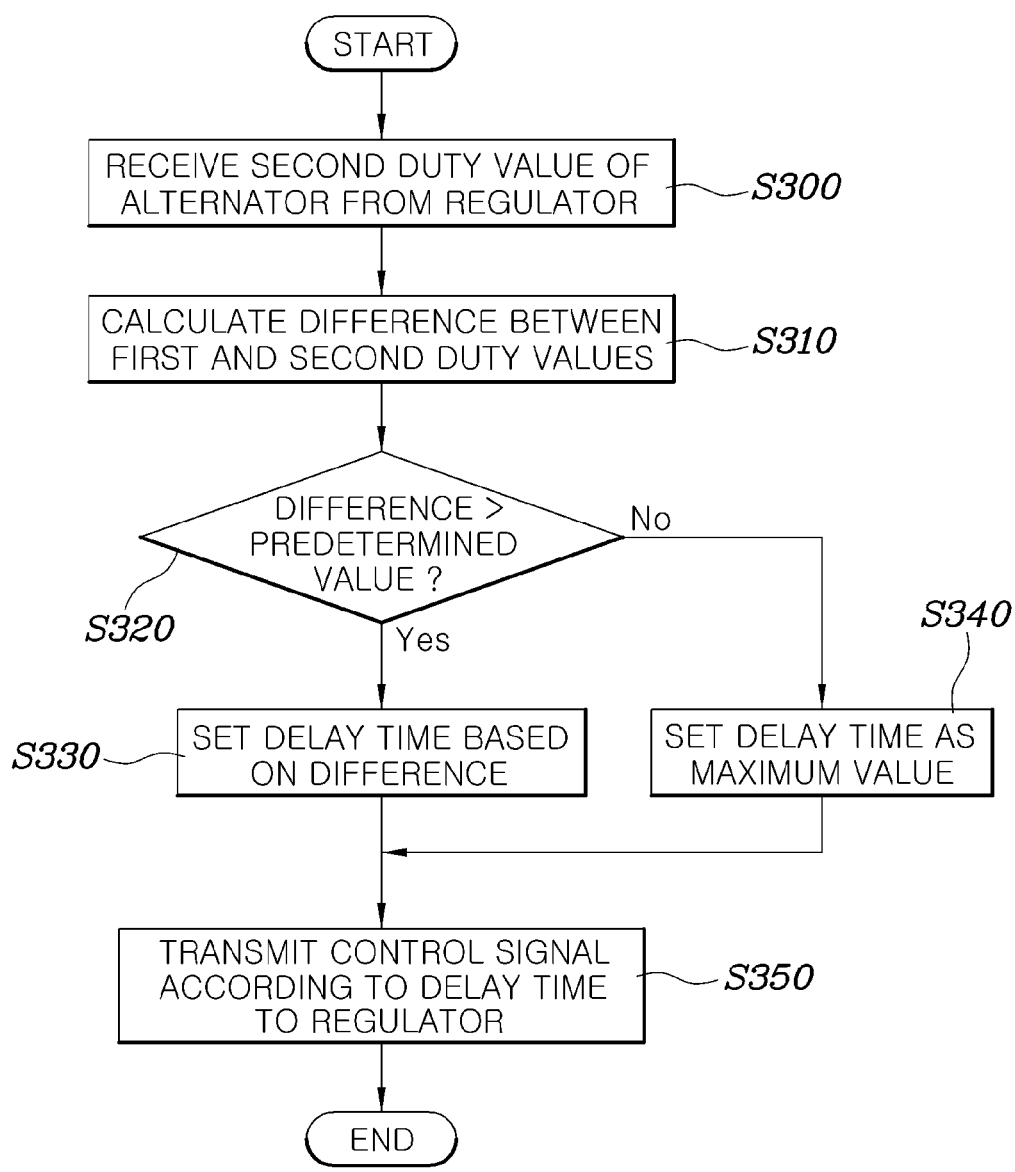
FIG. 3 is a flow diagram illustrating a method for controlling power generation of a vehicle according to an embodiment of the present inventive concept.

FIG. 3 is a flow diagram illustrating a method for controlling power generation of a vehicle according to an embodiment of the present inventive concept. Referring to FIG. 3, the method for controlling power generation of a vehicle may include receiving information about a current output duty value of the alternator 110 from the regulator 113 (S300). A difference between a first duty value and a second duty value is calculated after receiving the information in which the first duty value is an output duty value of the alternator before a predetermined time and the second duty value is a current output duty value (S310). A control signal is transmitted to the regulator 113 for increasing the power generated by the alternator 110 during a delay time based on the calculated difference (S350).

Before transmitting the control signal, the difference is further compared with a predetermined value (S320) and the delay time is set (S330, S340) according to the result of comparison. When transmitting the control signal (S350), the control signal is transmitted based on the set delay time.

As the result of comparison, when the difference is greater than the predetermined value, the delay time is set longer when setting the delay time as the difference increases.

When the difference is equal to or less than the predetermined value as the result of comparison, the delay time is set as a maximum value when setting the delay time (S340). Here, a control signal, which indicates that the power generation of the alternator is not increased, is transmitted when transmitting the signal (S350).

According to the apparatus and method for controlling power generation of a vehicle as described above, the duration for which an LRC function is performed is variably controlled based on the amount of power generated by an alternator and variation in the power, thus effectively preventing rapid variation in engine RPM of the vehicle and charging faults.

Additionally, LIN communication using digital values, rather than an existing PWM communication method, is applied to an alternator, so that a duty value of the alternator and an LRC signal according to the duty value may be accurately transmitted to and received from a controller.

Although the exemplary embodiments of the present inventive concept have been disclosed for illustrative purposes, those skilled in the art will appreciate that various modifications, additions, and substitutions are possible, without departing from the scope and spirit of the invention as disclosed in the accompanying claims.

What is claimed is:

1. An apparatus for controlling power generation of a vehicle, comprising:
   an alternator for generating electricity using an engine torque;
   a controller configured to calculate a difference between a first duty value and a second duty value and to transmit a control signal based on the difference; and
   a regulator for gradually increasing an amount of power generation of the alternator during a delay time, the delay time being based on the difference between the first duty value and the second duty value received from the controller,
   wherein the first duty value is a power output duty value of the alternator before reaching a set time and the second duty value is a current output duty value of the alternator.

2. The apparatus of claim 1, wherein the controller and the regulator communicate with each other through local interconnect network (LIN) communication.

3. The apparatus of claim 1, wherein the controller is an engine control unit (ECU).

4. The apparatus of claim 1, wherein when the difference is greater than a predetermined value, the controller transmits a control signal that increases the delay time as the difference is higher.

5. The apparatus of claim 4, wherein the delay time is previously mapped to the difference.

6. The apparatus of claim 1, wherein when the difference is equal to or less than a predetermined value, the controller sets the delay time to a maximum value and transmits a control signal to prevent the amount of power generation from increasing by instructing the regulator that controls the alternator.

7. The apparatus of claim 1, wherein the regulator operates the alternator normally after the delay time elapses.

8. A method for controlling power generation of a vehicle, the method comprising steps of:

receiving, by a controller, a first duty value containing information about a power output duty value of an alternator before reaching a set time, and receiving, by the controller, a second duty value containing information about a current output duty value of the alternator from a regulator;

calculating a difference between the first duty value and the second duty value; and transmitting, by the controller, a control signal to the regulator for gradually increasing an amount of power generation of the alternator during a delay time, the delay time being based on the calculated difference.

9. The method of claim 8, further comprising steps of:

comparing the difference with a predetermined value before the step of transmitting the control signal; and setting the delay time according to the comparison result of the difference with the predetermined value, wherein, in the step of transmitting the control signal, the control signal is transmitted based on the set delay time.

10. The method of claim 9, wherein, when the difference is greater than the predetermined value, the delay time is set to be longer as the difference is higher in the step of setting the delay time.

11. The method of claim 9, wherein, when the difference is equal to or less than the predetermined value, the delay time is set to a maximum value in the step of setting the delay time, and when the delay time is set to the maximum value, the controller transmits a control signal to prevent an amount of power generation of the alternator from increasing in the step of transmitting the control signal.

* * * * *